United States Patent [19]

Tsukada et al.

[11] E Patent Number: Re. 33,340

[45] Reissued Date of Patent: Sep. 18, 1990

[54] COLOR PRINTER HAVING APPARATUS FOR SHIFTING INK RIBBON

[75] Inventors: Tetsuo Tsukada, Kawasaki; Hideyuki Shimobuchi, Akishima; Takahiro Yoshikawa, Sagamihara, all of Japan

[73] Assignee: Fujitsu Limited, Kawasaki, Japan

[21] Appl. No.: 187,632

[22] Filed: Apr. 28, 1988

Related U.S. Patent Documents

Reissue of:

[64] Patent No.: 4,695,175
Issued: Sep. 22, 1987
Appl. No.: 788,566
Filed: Oct. 17, 1985

[30] Foreign Application Priority Data

Oct. 23, 1984 [JP] Japan ..... 59-222607

[51] Int. Cl.[5] ..... B41J 32/02

[52] U.S. Cl. ..... 400/196.1; 400/216.1; 400/225; 400/240; 400/240.4; 400/248

[58] Field of Search ..... 400/194, 195, 196, 196.1, 400/207, 208, 208.1, 216.1, 217, 227.2, 240, 240.4, 225, 248

[56] References Cited

U.S. PATENT DOCUMENTS

| | | | |
|---|---|---|---|
| 4,011,934 | 3/1977 | Ploby et al. | 400/248 X |
| 4,329,072 | 5/1982 | Kacmarcik | 400/208 |
| 4,407,595 | 10/1983 | Gershnow | 400/208 X |
| 4,425,046 | 1/1984 | Van Horne et al. | 400/208 |
| 4,543,002 | 9/1985 | Bittner et al. | 400/240.4 X |
| 4,563,100 | 1/1986 | Hamamichi | 400/216.1 X |
| 4,568,209 | 2/1986 | Zerillo | 400/216.1 |

FOREIGN PATENT DOCUMENTS

| | | | |
|---|---|---|---|
| 0033975 | 4/1981 | Japan | 400/227.2 |
| 0012782 | 1/1983 | Japan . | |
| 0016881 | 1/1983 | Japan | 400/217 |
| 0084788 | 5/1983 | Japan | 400/208 |
| 0078879 | 5/1984 | Japan | 400/208 |
| 0162080 | 9/1984 | Japan | 400/216.1 |
| 0176084 | 10/1984 | Japan | 400/208 |
| 0182773 | 10/1984 | Japan . | |

*Primary Examiner*—Ernest T. Wright, Jr.
*Attorney, Agent, or Firm*—Staas & Halsey

[57] ABSTRACT

A color printer inludes an ink ribbon supporting frame mounted on a base unit swingingly about an axis parallel to a platen. A ribbon cassette comprises a cassette case for accommodating a color ink ribbon which as a plurality of different color longitudinal stripes so that at least a part of the ink ribbon forms a loop exposed from and extending to the cassette case. The ribbon loop is positioned along the platen and between a printing head and the platen, when the ribbon cassette is set on the ribbon frame. A ribbon guide is slidably mounted on a carrier for supporting the ink ribbon at a position adjacent to the printing head. The ribbon frame and ribbon guide are simultaneously shifted so that a desired one of color stripes of the ink ribbon is positioned on a predetermined printing line.

25 Claims, 10 Drawing Sheets

COLOR PRINTER HAVING APPARATUS FOR SHIFTING INK RIBBON

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a color printer having an apparatus for shifting an ink ribbon. More particularly, it relates to a color printer having an apparatus for swing shifting a ribbon frame on which an ink ribbon cassette is mounted, and simultaneously shifting transversely an ink ribbon in a serial printer, such as a wire dot printer for multi-color printing by means of dots.

2. Description of the Related Art

Recently, multi-color printing has become more and more in demand, and accordingly, a printing system has been developed for color printing with a color ink ribbon having a plurality of color stripes arranged along the transverse direction thereof and which transversely shifts the ribbon.

In such a printing system, the color printer and the shifting apparatus should be small and the shifting operation should be conducted smoothly and precisely.

Japanese Unexamined Patent Publication (kokai) No. 58-12782 discloses a serial-type color printer, in which a ribbon cassette accommodating a color ink ribbon is mounted on a printer base and a ribbon guide is mounted on a carriage so as to be movable up and down to shift the ink ribbon. However, in this printer, the ribbon cassette itself is not swing moved, but remains stationary on the printer base. Therefore, this printer is not appropriate for use with a multi-color ink ribbon having a larger width thereof, since if the ink ribbon was moved or shifted for a long transverse distance, the ink ribbon would be misaligned, which would affect the smooth running of ribbon in the longitudinal direction thereof. In fact, this type of printer is usually used with a two-color ink ribbon, such as a black and red ribbon, having two color-stripes, in which the ink ribbon is shifted along a smaller transverse distance.

Japanese Unexamined Patent Publication (Kokai) No. 59-182773 discloses a color printer, in which an ink ribbon cassette accommodating a color ink ribbon is carried on a carriage which is movable longitudinally along a platen. The ink ribbon cassette is also movable along the platen and swingingly shifted so that a desired color stripe of the ink ribbon is positioned on a predetermined printing line. However, in this printer, the ink ribbon is shifted in unison with the ribbon cassette and there is no ink ribbon guide for guiding the ink ribbon.

SUMMARY OF THE INVENTION

Accordingly, an object of the present invention is to provide a color printer having an apparatus for swing shifting a ribbon frame on which an ink ribbon cassette is mounted, and simultaneously, shifting an ink ribbon transversely via a ribbon guide.

Another object of the present invention is to provide a color printer in which the color printer per se, and the shifting apparatus thereof, are small and the shifting operation is smoothly and precisely conducted.

According to the present invention, a color printer basically includes: a base unit; a cylindrical platen rotatably mounted on the base unit for supporting and guiding printing paper; a printing head; a carrier reciprocally movable along the platen for supporting the printing head to reciprocally move the head along a printing line on the printing paper on the platen; an ink ribbon supporting frame mounted on the base unit capable of swinging about an axis parallel to the platen, the ribbon frame being capable of having a color ink ribbon cassette detachably mounted thereon, the cassette comprising a cassette case for accommodating therein a color ink ribbon which has a plurality of different color longitudinal stripes so that at least a part of the ink ribbon forms a loop exposed from and extending to the cassette case, which ribbon loop is positioned along the platen and between the printing head and platen, when the ribbon cassette is set on the ribbon frame; a ribbon guide member slidably mounted on the carrier for supporting the ink ribbon at a position adjacent to the printing head, means for slidably shifting the ribbon guide member so that a desired one of the color stripes of the ink ribbon is positioned on the printing line; and, means for swing shifting the ribbon frame so that the position of the cassette case substantially follows the shifted position of the ink ribbon.

DESCRIPTION OF THE PREFERRED EMBODIMENTS

Figure 1:
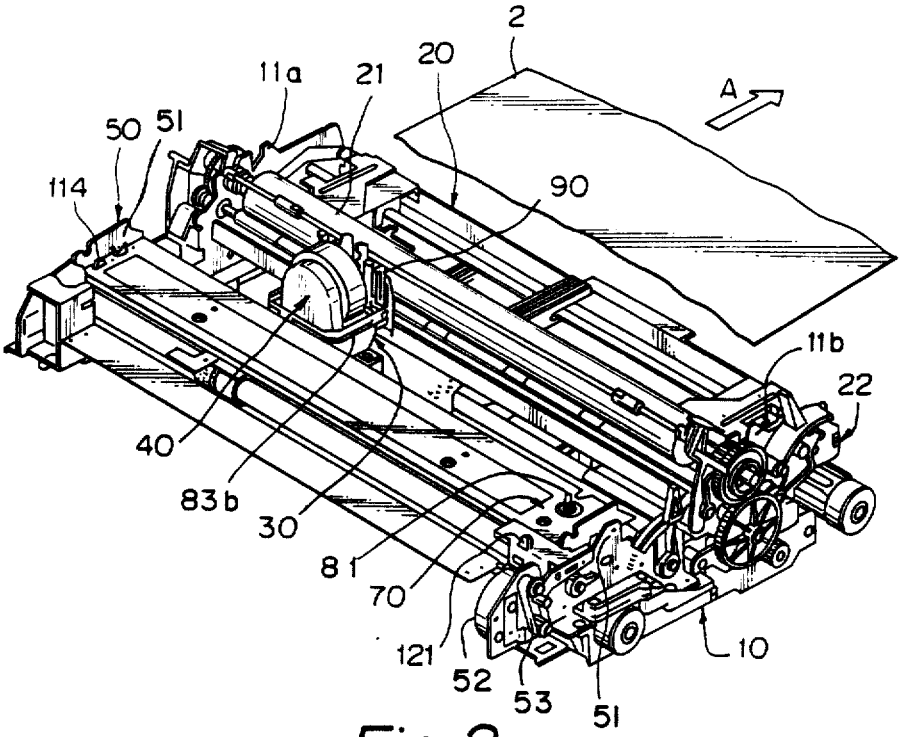
FIG. 1 is a schematic perspective view of an embodiment of a color printer according to the present invention.

Referring now to the drawings, a printer according to the present invention is generally shown in FIG. 1, in which reference numeral 10 indicates a base unit; 20, a platen unit; 30, a head carrier unit; 40, a printing head; 50, a ribbon supporting frame; 70, a space motor assembly for driving the head carrier unit [30] *40*; and 90, an ink ribbon guide.

A cylindrical platen 21 is rotatably supported by respective left and right side plates 11a and 11b of the base unit 10 and driven by a sheet feed mechanism generally indicated at 22 to feed a printed sheet 2 in the direction indicated by an arrow A. The carrier unit 30 carries the printing head 40 and is reciprocally movable in parallel to the longitudinal direction of the platen 21, as will be mentioned later. The ribbon frame 50 is swingably supported by the respective side plates 11a and 11b about an axis 130 parallel to the platen 21, as will be also described in detail later.

Figure 2:
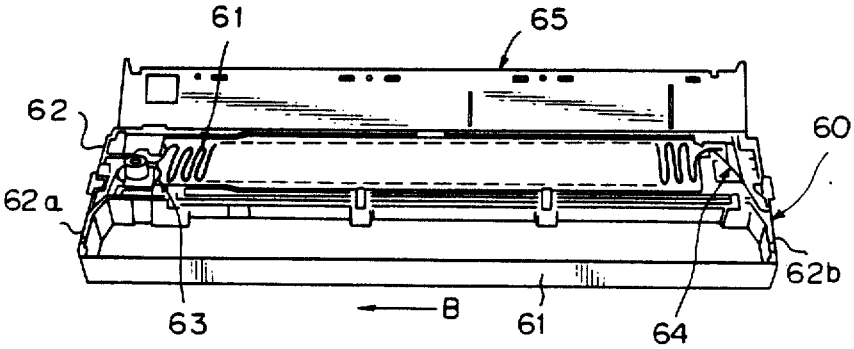
FIG. 2 is a perspective view of an embodiment of a ink ribbon cassette to be used in the color printer according to the present invention.

FIG. 2 illustrates a ribbon cassette 60 which is used in the printer of this invention. An endless color ink ribbon 61 is accommodated in zig-zag style in a ribbon cassette case 62 and extends in a loop between respective arm portion 62a and 62b transversely projected from the cassette case 62 at its respective ends. At one end of the cassette case 62, a ribbon feed roller 63 is provided for feeding the ink ribbon 61 in the direction indicated by an arrow B, and a braking means 64, such as a leaf spring, is provided at the other end of the cassette case 62 for giving an appropriate tension to the ribbon 61. After the ink ribbon 61 is loaded, the cassette case 62 is covered with a lid 65 and placed on the ribbon supporting frame 50 (FIG. 1), so that the ink ribbon 61 is positioned between the platen 21 and the printing head 40 and in parallel to the platen 21, to be movable in parallel thereto along a ribbon guide 90 mounted on the head carrier 30, in FIG. 1.

Figure 3:
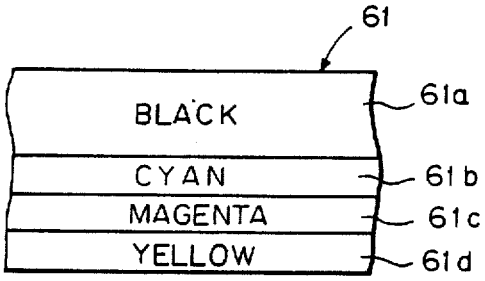
FIG. 3 is a top view showing a part of a color ink ribbon.

FIG. 3 illustrates an example of the multi-color ink ribbon 61, in which four color longitudinal ink stripes 61a, 61b, 61c, and 61d are arranged, in order from deep to light colors, for example, black, cyan, magenta, and yellow, respectively, in the direction of its width. As will be seen from FIG. 3, the width of black color stripe 61a, which is, in general, more frequently used, is larger than any one of the other color stripes 61b, 61c, and 61d, which are less used.

Figure 4:
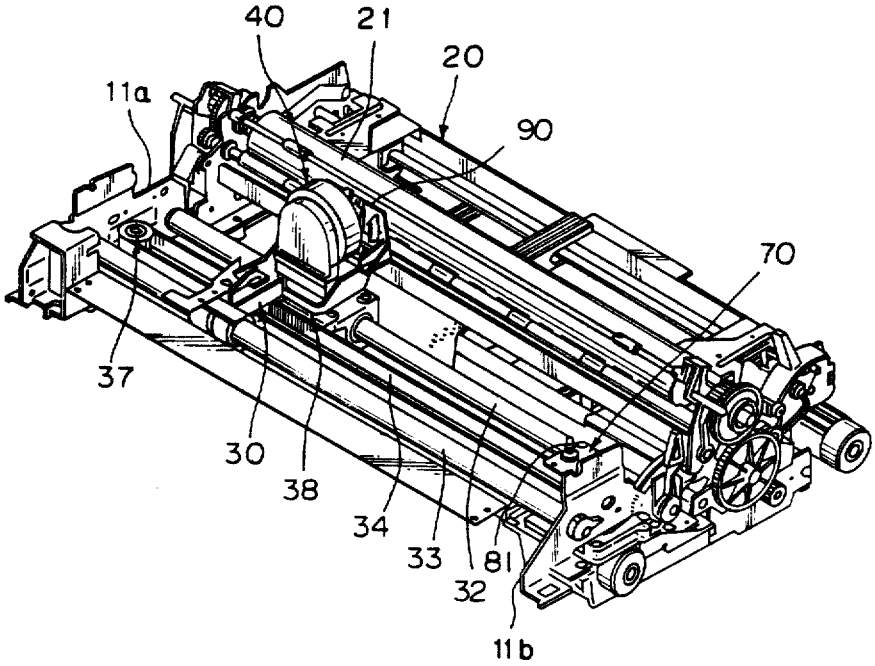
FIG. 4 is a schematic perspective view similar to FIG. 1, except that the ribbon supporting frame is omitted.

FIG. 4 is a view similar to FIG. 1, except that the ribbon supporting frame 50 (FIG. 1) is omitted. The head carrier 30 is slidingly movably supported by a pair of parallel guide shafts 32 and 33 which are arranged in parallel to the platen 21 and rigidly secured to the left and right side plates 11a and 11b at their respective ends. Between these shafts 32 and 33, is arranged in parallel thereto an endless timing belt 34 which extends over a drive pulley 72 (FIGS. 5 and 6) of a step or pulse motor 71 and a tension pulley 37. The position of the tension pulley 37 is, of course, adjustable in the longitudinal direction to provide an appropriate tension to the belt 34. The head carrier 30 is connected to the timing belt 34 by means of belt clamp 38, so that the head carrier 30 reciprocally moves from one to the other end of the platen 21 along the guide shafts 32 and 33, when the step motor 71 (FIGS. 5 and 7) rotates in one or the other direction alternately.

Figure 5:
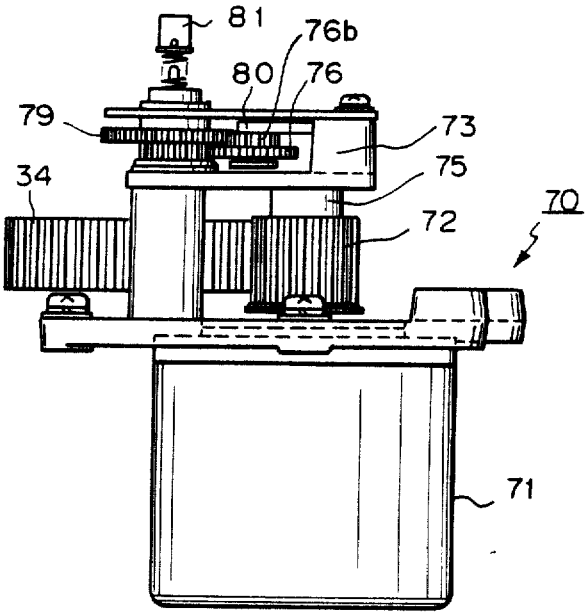
FIG. 5 is a side elevational view of a space motor and ribbon feed mechanism.
Figure 7:
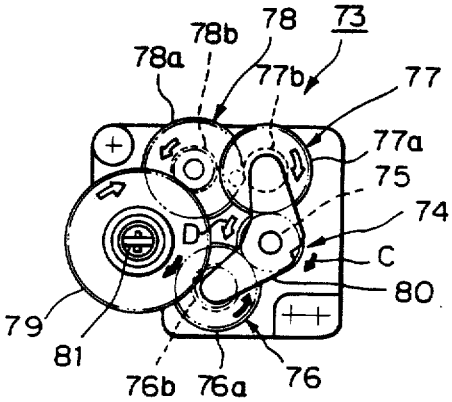
FIG. 7 is a top plan view of a space motor and ribbon feed mechanism shown in FIG. 5.
Figure 6:
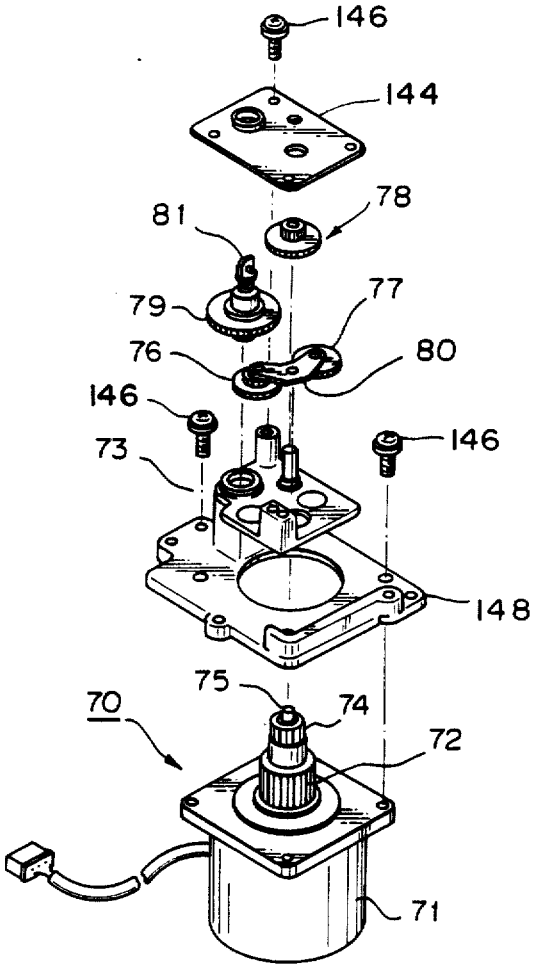
FIG. 6 is a schematic fragmentary view of a space motor and ribbon feed mechanism shown in FIG. 5.

FIGS. 5, 6, and 7 illustrates a space motor assembly 70 including the above-mentioned step motor 71, which also drives the ink ribbon 61 (FIG. 2) by means of a ribbon feeding mechanism 73. As shown in FIG. 7, the ribbon feeding mechanism 73 comprises a gear 74 fixed to an output shaft 75 of the step motor 71. A two-hand arm 80 is swingably mounted on the shaft 75 and carries first and second planetary gears 76 and 77 at the free ends thereof, respectively. The gears 76 and 77 have respective larger gear sections 76a and 77a which constantly engage with the gear 75 and respective smaller gear sections 76b and 77b. An idle gear 78 has a larger gear section 78a and a smaller gear section 78b which constantly engages with a drive gear 79. These drive and idle gears 79 and 78 and the gear 76 are arranged such that either the smaller gear sections 76b of the first planetary gear 76 directly engages with the drive gear 79 or the smaller gear 77b of the second planetary gear 77 engages with the larger gear 78a of the idle gear 78. Consequently, when the motor shaft 75 rotates in the clockwise direction in FIG. 7, the arm 80 swings in the same direction so that the smaller gear sections 76b of the first planetary gear 76 directly engages with the drive gear 79, while the smaller gear 77b of the second planetary gear 77 disengages from the larger gear 78a of the idle gear 78, as indicated by solid arrows C in FIG. 7. On the other hand, when the motor shaft 75 rotates in the counterclockwise direction in FIG. 7, the arm 80 swings in that direction so that the smaller gear sections 77b of the second planetary gear 77 engages with the larger gear section 78a of the idle gear 78, while the smaller gear 76b of the first planetary gear 76 disengages from the drive gear 79, as indicated by blank arrows D in FIG. 7. The drive gear 79 has a connecting pin 81, as seen from FIGS. 1, 4, and 5 to 7, which protrudes onto the ribbon frame 50 (FIG. 1). The above-mentioned ribbon feed roller 63 (FIG. 2) is engaged by the connecting pin 81 when the ribbon cassette 60 is set on the ribbon frame 50 (FIG. 1). As can be clearly understood from the above, the ink ribbon 61 is always fed in the same direction, as indicated by the arrow B in FIG. 2, since the drive gear 79 rotates in the same direction as shown by the arrows C and D in FIG. 7, regardless of the rotating direction of the step motor 71.

Gear mounting plates 144, 148 and 150 (FIG. 6) form a gear box and are attached to motor 71 via screws 146.

Figure 8:
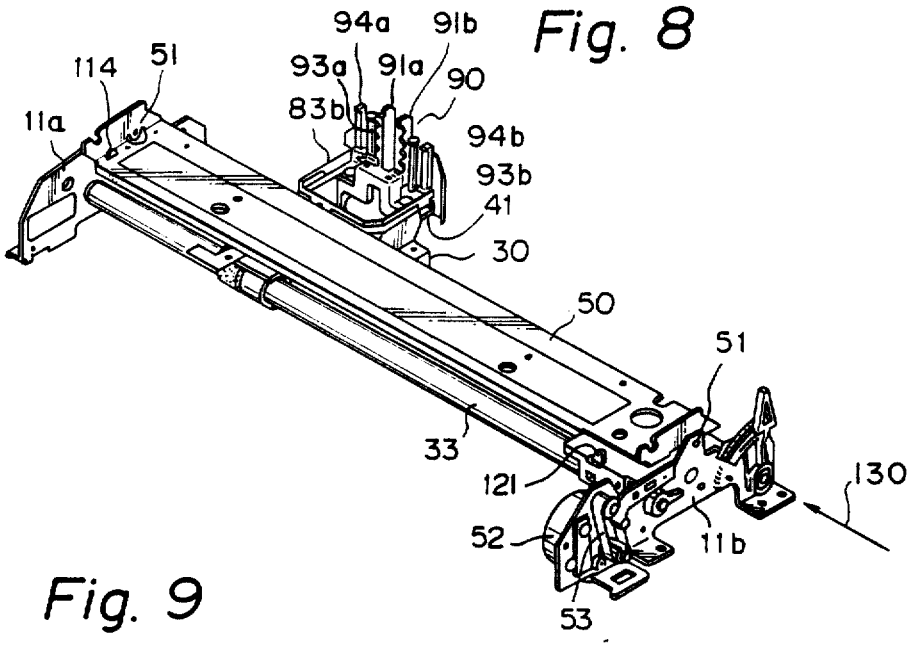
FIG. 8 is a schematic perspective view of an embodiment of a ribbon shaft mechanism of a color printer according to the present invention.
Figure 9:
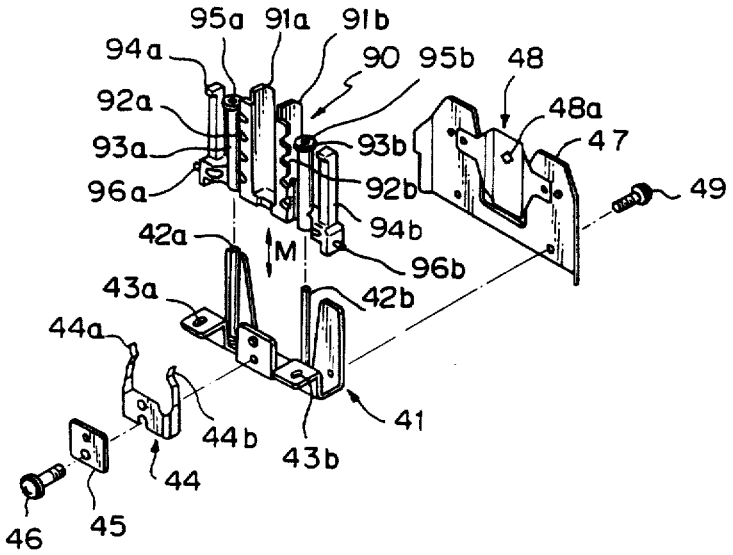
FIG. 9 is a fragmentary perspective view of a ribbon guide used in an embodiment of a color printer according to the present invention.
Figure 10:
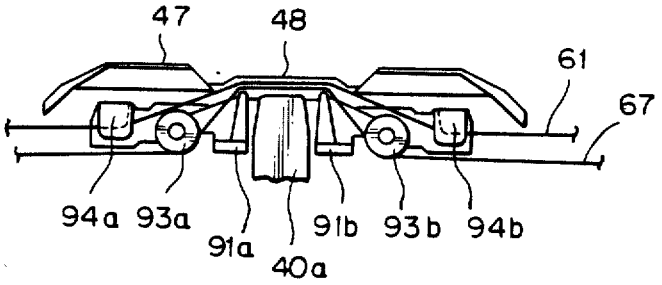
FIG. 10 is a top plan view of a ribbon guide provided with ribbon passages for multi-color and black ink ribbons, respectively.

FIG. 8 illustrates a ribbon shift mechanism, in which the ribbon frame 50 is swingably supported at the point shown by reference numeral 51 on the left and right side plates 11a and 11b of the base unit 10 so as to move swing about an axis 130 parallel to the platen 21 (FIGS. 1 and 4), as mentioned above, by means of a ribbon shift motor 52 mounted on one of the side plates 11b through a timing belt 53. As shown in the Figure, the head carrier 30 carries a ribbon guide 90. In FIGS. 8, 9, and 10, the ribbon guide 90 has a pair of symmetrically arranged vertical guide shafts 91a and 91b each having a substantially L-shaped horizontal cross-section, as seen from FIG. 10, and a top end 40a of the printing head 40 is positioned between the parallel parts of these shafts 91a and 91b. As seen from FIG. 9, in the rear side parts of these shafts 91a and 91b, guide groove- or corrugated-configurations 92a and 92b are provided, as will be described later. At the outer sides of the shafts 91a and 91b, the ribbon guide 90 has a pair of symmetrically arranged parallel vertical guide shafts 93a and 93b for guiding a standard black ink ribbon 67 (FIG. 10), which may be accommodated in another ink ribbon case (see 120 in FIG. 14) which has a size different from that shown in FIG. 2, but in the similar manner thereto. In addition, at the outer sides of these guide shafts 93a and 93b, the ribbon guide 90 also has a pair of symmetrically arranged parallel guide shafts 94a and 94b for guiding a color ink ribbon 61 as mentioned with reference to FIG. 2. The guide shafts 94a and 94b each has a longer or wider guide area corresponding to the width of the color ink ribbon 61. On the other hand, the guide shafts 93a and 93b each has a shorter or narrower guide area corresponding to the width of the standard black ink ribbon 67.

In FIGS. 8 and 9, a guide supporting bracket 41 is rigidly secured to the front end of the head carrier 30 through mounting slots or holes 43a and 43b. The above-mentioned ribbon guide 90 is mounted on bracket 41 by passing guide shafts 42a and 42b through guide slots or holes 95a and 95b. Thus, the ribbon guide 90 is vertically movable along the guide shafts 42a and 42b, as shown by arrows M, in a manner as described later. A lock spring 44 having a pair of resilient locking leaves 44a and 44b is rigidly mounted on the bracket 41 by means of a plate washer 45 and a screw 46 in such a manner that these locking leaves 44a and 44b are resiliently engaged with the corrugated guide grooves 92a and 92b, respectively. An indicator holder 47 is rigidly secured to the bracket 41 by means of screws 49. The holder 47 carries an indicator plate 48 having an lozenge-shaped indicator slot 48a at the printing position, through which the printing head 40 prints on a printing sheet 2 on the platen 21 (FIG. 1) via the ink ribbon 61 or 67.

In FIG. 10, the color ink ribbon 61 extends through and over one 94a of the outer guide shafts, one 91a of the central pair of guide shafts, the other 91b of the central pair of guide shafts, and the other 94b of the outer pair of guide shafts. On the other hand, the standard black ink ribbon 67 extends through and over one 93a of the inner guide shafts, one 91a of the central pair of guide shafts, the other 91b of the central pair of guide shafts, and the other 93b of the outer pair of guide shafts. Thus, as seen from FIG. 10, the color ink ribbon 61 which has a larger width is guided and bent by these guide shafts 94a, 91a, 91b, and 94b by smaller angles so as to reduce the resistance which would be exerted on the ink ribbon 61 when it is guided to run therethrough. Conversely, the standard black ribbon 67 which has a smaller width is guided and bent by larger angles, since the resistance which would be exerted on it is naturally smaller because of its smaller width.

Figure 11:
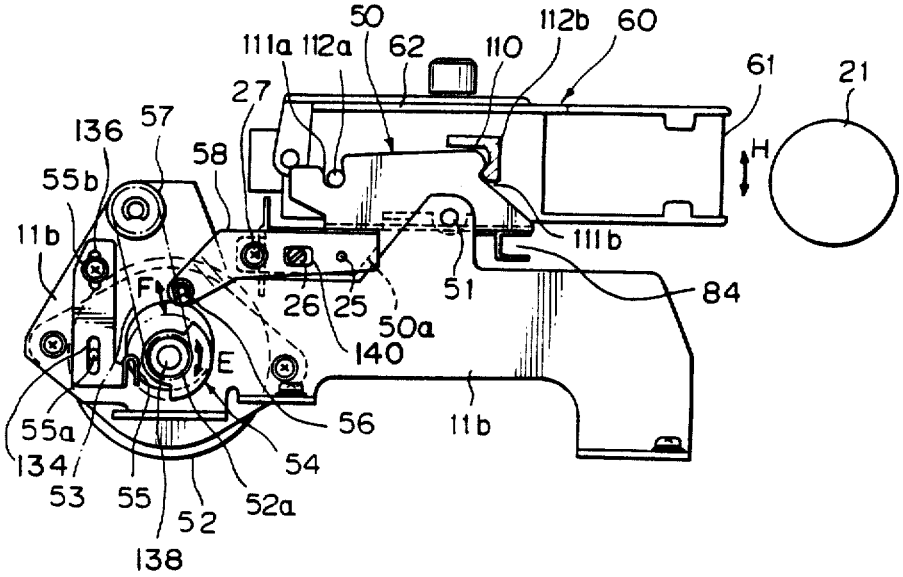
FIG. 11 is a elevational view of a ribbon frame shifting mechanism provided with a ribbon frame on which a multi-color and black ribbon cassette can be mounted, respectively.

FIG. 11 illustrates a shift mechanism for shifting up and down the ribbon frame 50 on which an ink ribbon cassette 60 is mounted. This shift mechanism also shifts up and down the ribbon guide 90 FIGS. 8 and 9). The pulse or step motor 52 is rigidly mounted on the side plate 11b of the base unit 10 of the printer, as mentioned before. A driving pulley 52a is attached to the output shaft 138 of the motor 52. An endless timing belt 53 extends from the driving pulley 52a to an idle pulley 57 rotatably mounted on the side plate 11b at a position above the driving pulley 52a. The rotational movement of the step motor 52 is limited by a stop semi-disk member 54 attached to the output shaft 138 of the motor 52 and a stop plate 55 adjustably mounted on the side plate 11b by a guide pin 55a and lock screw 55b through elongated slots 134 and 136 of the stop plate 55. Consequently, the motor 52 is allowed to rotate from a position at which one end of the semi-disk member 54 is in contact with the stop plate 55 to a position at which the other end of the semi-disk member 54 is in contact with the stop plate 55. The timing belt 53 is connected to a connecting arm 58 through a belt clamp 56. The connecting arm 58 is adjustably connected to an elongated portion 50a of the ribbon frame 50. In other words, the arm 58 is pivotally connected to the portion 50a of the ribbon frame at a pin 25, but rigidly secured thereto by a lock screw 27. An eccentric adjusting pin 26 is inserted into holes 140 passing through the arm 58 and the elongated portion 50a. Therefore, the mutual relationship between the timing belt 53 and the ribbon frame 50 can be adjusted by rotating the eccentric pin 26 and fastening the locking screw 27. As will be understood from the above, the ribbon frame 50 is swingable, as shown by arrows H, about the pins 51 on the side plates 11a and 11b with the ink ribbon cassette 60, when the step motor 52 rotates in the direction indicated by arrows E in FIG. 11 by a predetermined angle via the timing belt 53, which is movable in the direction indicated by arrows F in FIG. 11, the belt clamp 56, the connecting arm 58, and the elongated portion 50a of the ribbon frame 50, in such a manner that a desired one of the color stripes 61a, 61b, 61c, and 61d (FIG. 3) of the ink ribbon cassette 60 is positioned on the predetermined printing line.

Figure 12:
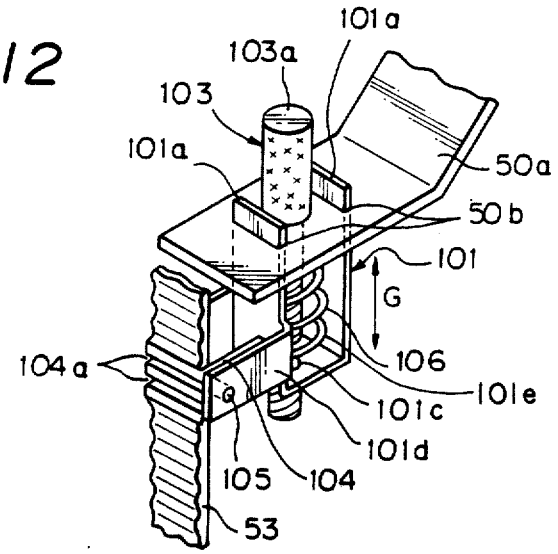
FIG. 12 is a perspective view of an embodiment of a connecting means for connecting a timing belt to the ribbon frame.

FIG. 12 illustrates another embodiment of a connecting means for connecting the timing belt 53 to the elongated portion 50a of the ribbon frame 50. In this embodiment, the flat elongated portion 50a of the ribbon frame 50 has a pair of parallel elongaged slots 50b arranged in parallel to the timing belt 53. A U-shaped connecting member 101 has a pair of legs 101a which are slidably inserted into the slots 50b. An adjusting screw 103 is inserted through the elongated portion 50a and engaged with a threaded hole 101c at the bottom 101e of the connecting member 101. A spring 106 is disposed between the bottom 101e of the connecting member 101 and the elongated portion 50a. The connecting member 101 has a pair of arms 101d protruding toward the timing belt 53 to form a U-shaped configuration. On the other hand, a U-shaped belt clamp member 104 has a plurality of slots 104a which facilitate the engagement with the corrugated configuration on the inside face of the timing belt 53. This clamp member 104 is rigidly connected to the arms 101d of the connecting member 101 by means of a connecting pin 105. As will be understood, the connecting member 101 can be movable in the direction indicated by arrows G in FIG. 12 and, thus, the mutual relationship between the timing belt 53 and the elongated portion 50a (ribbon frame 50 in FIG. 11) can be adjusted by rotating a head 103a of the adjusting screw 103.

Figure 13:
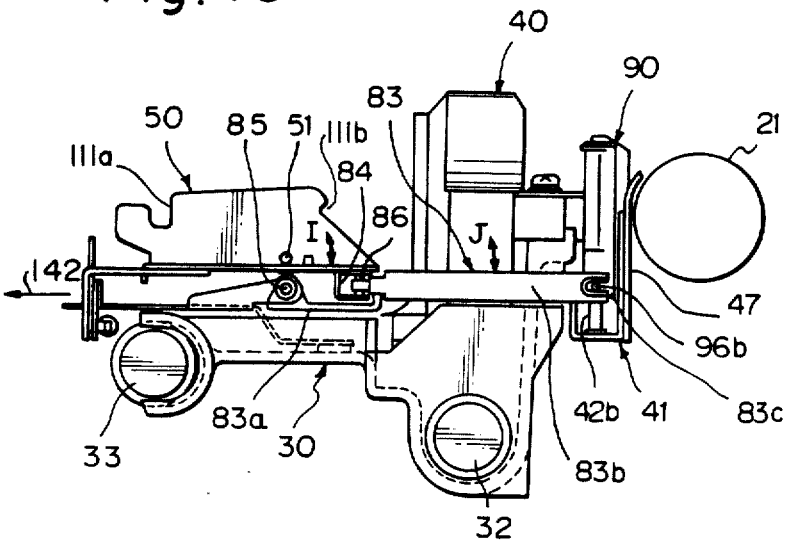
FIG. 13 is a schematic side elevational view of a shifting mechanism for shifting the ribbon guide up and down.

In FIG. 13, the head carrier 30 is reciprocally movable along the guide shafts 32 and 33, as mentioned above. On this carrier 30, a shift lever 83 is mounted pivotally about a pivot pin 85 which is arranged just under, adjacent, and in parallel to the pivot shaft 51 of the ribbon frame 50. The shift lever 83 comprises a base portion 83a extending from the pivot pin 85 to the front edge of the ribbon frame 50, and two-armed lever portions 83b, as also seen from FIG. 1, stepping over the printing head 40 and extending to the ribbon guide 90. The ribbon frame 50 carries under the front edge thereof a U-shaped channel member 84 which extends along substantially the entire length of the frame 50 and is opened to the front side. On the other hand, on the shift lever 83 a roller 86 is mounted rotatably about an axis 142 perpendicular to the pivot pin 85. The roller 86 engages with the channel member 84 to slide move therealong when the head crrier 30 reciprocally moves along the guide shaft 34 and 33. At the front ends of the two-armed portions 83b of the lever 83 provided are notches 83c, which engage with a pair of projections 96a and 96b (FIG. 9), respectively, of the ribbon guide 90.

When the ribbon frame 50 is shifted or swing moved about the pivot shaft 51 as indicated by arrows 1 in FIG. 13 by means of the pulse motor 52 (FIGS. 8 and 11), as mentioned above with reference to FIGS. 11 and 12, the shift lever 83 follows to swing about the pivot pin 85 as indicated by arrows J, since the roller 86 carried on the lever 83 engages with the channel member 84 of the ribbon frame 50. Thus, the ribbon guide 90 is shifted up or down through the shift lever 83. However, since the corrugated guide groove configurations 92a and 92b (FIG. 9) are resiliently engaged by the pair of spring leaves 44a and 44b, respectively, the ribbon guide 90 hops along the supporting shafts 42a and 42b of the bracket 41. Thus, a desired one of the color stripes 61a, 61b, 61c, and 61d (FIG. 3) of the color ink ribbon 61 is selectively positioned o the printing line by the ribbon guide 90, as seen from FIG. 13. The pulse motor 52 (FIGS. 8 and 11) is advantageously energized slightly over or past a position at which the spring leaves 44a and 44b (FIG. 9) resiliently engage with the guide grooves 92a and 92b, respectively, to facilitate the above-mentioned hopping movement of the ribbon guide 90.

The ink ribbon cassette 60 is set on the ribbon frame 50 in a manner shown in FIG. 11. In FIG. 11, the ribbon frame 50 has side walls 110 extending upward from its respective ends, each of which side walls 110 has two notches 111a and 111b. On the other hand, the cassette case 62 made of any suitable plastic has at each of the respective sides thereof two projections 112a and 112b, which are resiliently engaged by the two notches 111a and 111b, respectively. Thus, when the color ink ribbon cassette 60 is mounted on the ribbon frame 50, the bottom of cassette case 62 is substantially in contact with the base surface of the ribbon frame 50.

Figure 14:
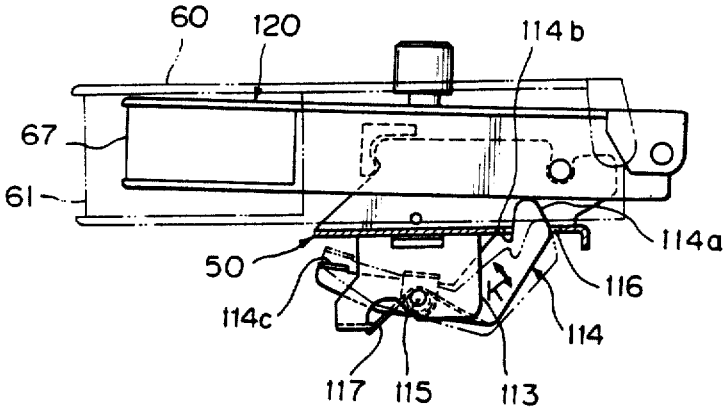
FIGS. 14 and 15 are schematic side elevational views of means for detecting the cassette ribbon.
Figure 15:
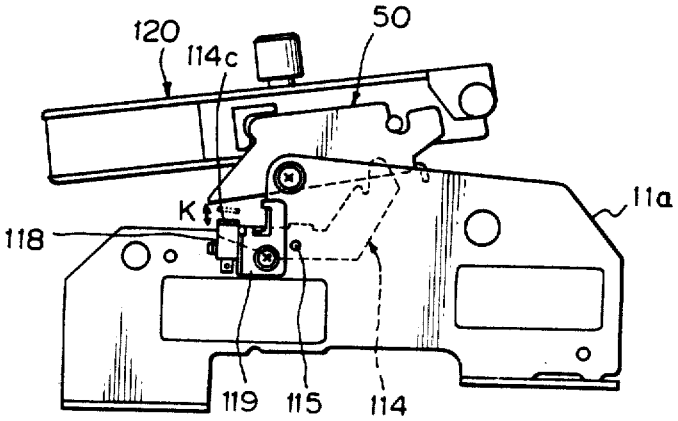

FIGS. 14 and 15 illustrate detecting means of the ink ribbon cassette 60/120. As mentioned above, either the color or the monochromatic (black) ink ribbon cassette 60/120 can be used in the printer of this invention. A black ink ribbon cassette 120 has a size different from that of the color ink ribbon cassette 60, and the width of the black ink ribbon 67 in smaller than that of the multicolor ink ribbon 61, although the black ribbon cassette 120 can be mounted on the ribbon frame 50 in basically the same manner as the latter. However, the bottom of the black ribbon cassette 120 does not come into contact with the bottom surface of the ribbon frame 50, since the thickness of the black ink ribbon cassette 120 is smaller than that of the color ink ribbon cassette 60.

In FIGS. 14 and 15, the ribbon frame 50 has a bracket 113 rigidly secured thereto at the bottom thereof and an actuator lever 114 is pivotally mounted on the bracket 113 about a pin 115, as shown by arrows K. The actuator lever 114 is pivotally biased by a torsion spring 117 disposed between the bracket 113 and the lever 114, so that one end 114a of the lever 114 protrudes upward through a slot 116 provided in the bottom surface of the ribbon frame 50, until a stop portion 114b of the lever 114 comes into contact with the bottom of the frame 50. On the other hand, as seen from FIG. 15, a microswitch 118 is mounted on the side frame [11b] *11a* by means of a bracket 119. When the ribbon frame 50 is unloaded, or loaded with the black ribbon cassette 120 (the bottom thereof does not actuate the lever 114), the actuator lever 114 is pivotally moved by the spring 117 in the counterclockwise direction in FIGS. 14 and 15, so that the other end 114c of the lever 114 comes into contact with the microswitch 118 to turn it ON. The microswitch 118 is connected to a control unit, not illustrated, which controls the ribbon shift motor 52 (FIGS. 5 and 11) to automatically set the ribbon frame 50 and ribbon guide 90 at their initial positions (i.e., black ribbon printing mode), in which the ribbon guide 90 is in its uppermost position so that setting the ink ribbon on the ribbon guide 90 can be easily carried out.

When the color ink ribbon cassette 60 is loaded on the ribbon frame 50, the bottom of the cassette 60 comes into contact with the actuator lever 114 to pivotally move it in the clockwise direction in FIGS. 14 and 15 about the pin 115 so that the other end 114c of the lever 114 is disengaged from the microswitch 118 to turn it OFF. Thus, the control unit sets this printer at a color ribbon printing mode.

Figure 16:
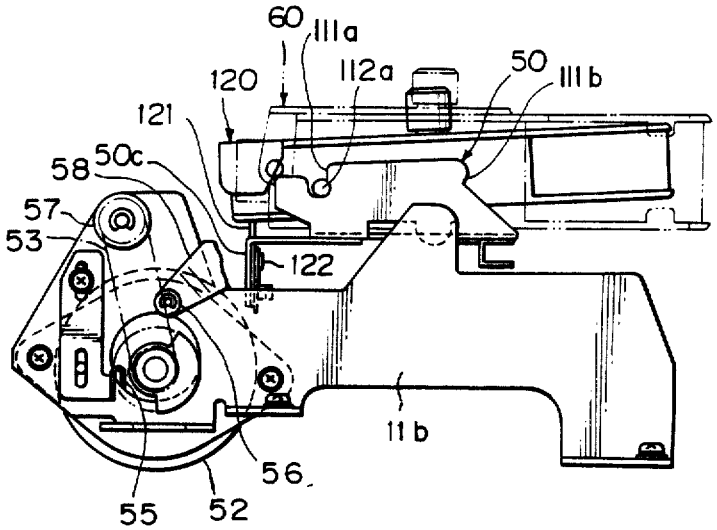
FIG. 16 is a schematic side elevational view of means for locking the ribbon frame at the initial position thereof when a black ribbon cassette is mounted on the ribbon frame.
Figure 17:
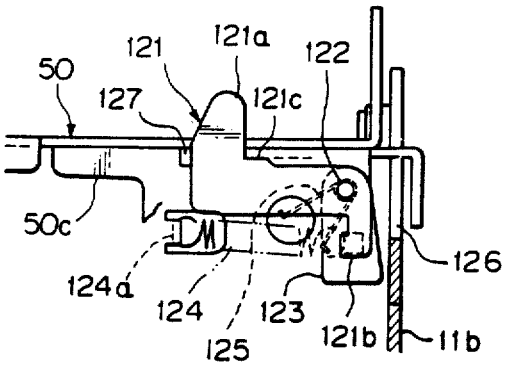
FIGS. 17 and 18 are schematic side elevational views of a part of FIG. 16 showing the operation of the locking mechanism.
Figure 18:
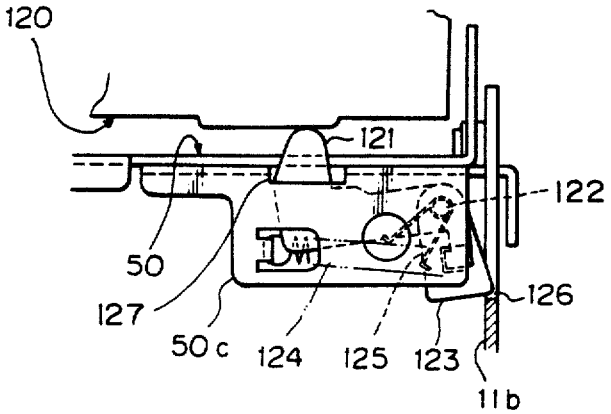

FIGS. 16, 17, and 18 illustrate means for locking the ribbon frame 50 at the black ribbon printing mode. Another actuator lever 121 is mounted pivotally about a pin 122 on a rear extended portion 50c of the ribbon frame 50. The lever 121 has one end [121] *121a* protruding upward through a slot 127 of the extension 50c and the other end 121b. The lever 121 is pivotally biased by a coil spring 124 disposed between the extension 50c at point 124a and the other end 121b of the lever 121 so that the one end 121a of the lever 121 protrudes upward through the slot 127 until a stop portion 121c of the lever 121 comes into contact with the lower surface of the extension 50c. A stop member 123 is also pivotally mounted about the same pin 122 and biased in the counterclockwise direction in FIGS. 17 and 18, by means of a torsion spring 125 disposed between the stop 123 and the actuator lever 121. Until it is engaged by the actuator lever 121 at a position as shown in FIG. 17.

When the color ribbon cassette 60 which as a smaller dimension in the transverse direction than that of the black ribbon cassette 120 is mounted on the ribbon frame 50, the cassette 60 itself does not come into contact with the actuator lever 121, as seen from FIG. 16. However, when the black ribbon cassette 120 which has a larger dimension in the transverse direction is mounted on the ribbon frame 50, the actuator lever 121 is pushed and pivotally moved about the pin 122 in the counterclockwise direction in FIGS. 17 and 18 to allow the stop 124 to pivotally move toward the side frame 11b of the base unit 10. On the other hand, the ribbon frame 50 is automatically shifted to the initial position by the step or pulse motor 52, as mentioned before. Therefore, the stop 123 comes to fit into an opening edge 126 of the side frame 11b and engages therewith to lock the ribbon frame 50 at its initial position to prevent the shifting movement of the ribbon frame 50 when loading with a black ink ribbon cassette 120 which has a smaller ribbon width. When the black ribbon cassette 120 is removed from the ribbon frame 50, the actuator lever 121 is pivotally moved in the clockwise direction by the coil spring 124 so that the stopper 123 is also pivotally moved in the clockwise direction by the actuator lever 121 to come away from the slot 126 and allow the shifting movement of the ribbon frame 50.

We claim:

1. A color printer, comprising:

a base unit;

a cylindrical platen rotatably mounted on said base unit for supporting and guiding a printing paper;

a printing head;

a carrier reciprocally movable along said platen for supporting said printing head to reciprocally move said printing head along a printing line on the printing paper on said platen;

an ink ribbon supporting frame mounted on said base unit swingably about an axis parallel to said platen, said ink ribbon supporting frame being capable of having detachably mounted thereon a color ink ribbon cassette comprising a cassette case for accommodating therein a color ink ribbon which has a plurality of different color longitudinal strips so that at least a part of said ink ribbon forms a loop exposed from and extending to the cassette case, which ribbon loop is positioned along said platen and between said printing head and platen, when the color ink ribbon cassette is set on said ink ribbon supporting frame;

a ribbon guide member slidably mounted on said carrier for supporting said ink ribbon at a position adjacent to said printing head;

slide shifting means for slide shifting said ribbon guide member so that a desired one of said color stripes of the ink ribbon is positioned on said printing line; and swing shifting means for swing shifting said ink ribbon supporting frame so that the position of the cassette case substantially follows that of the shifted position of the ink ribbon, said swing shifting means being driven in accordance with said slide shifting means.

2. A color printer, comprising:

a base unit;

a cylindrical platen rotatably mounted on said base unit for supporting and guiding a printing paper;

a printing head;

a carrier reciprocally movable along said platen for supporting said printing head to reciprocally move said printing head along a printing line on the printing paper on said platen;

an ink ribbon supporting frame mounted on said base unit swingably about an axis parallel to said platen, said ribbon frame being capable of having detachably mounted thereon a color ink ribbon cassette comprising a cassette case for accommodating therein a color ink ribbon which has a plurality of different color longitudinal stripes so that at least part of the ink ribbon forms a loop exposed from and extending to the cassette case, which ribbon loop is positioned along said platen and between said printing head and platen, when the color ink ribbon cassette is set on said ink ribbon supporting frame;

a ribbon guide member slidably mounted on said carrier for supporting said ink ribbon at a position adjacent to said printing head; and shifting means for swing shifting said ink ribbon supporting frame and slide shifting said ribbon guide member so that a desired one of said color stripes of the ink ribbon is positioned on said printing line, and said shifting means comprising a pulse motor, first means for transmitting a rotational movement of said pulse motor to said ink ribbon supporting frame to swingably move said ink ribbon supporting frame, and second means for transmitting the swinging movement of said ink ribbon supporting frame to said ribbon guide member to slidably move said ribbon guide member.

3. A color printer as set forth in claim 2, wherein said first transmitting means comprising an endless timing belt extending between a timing pulley of said pulse motor and an idle pulley rotatably mounted on the base unit, and a belt clamp for connecting said timing belt to said ink ribbon supporting frame.

4. A color printer as set forth in claim 3, wherein said first transmitting means further comprises means for adjusting the mutual relationship between said belt clamp and said ink ribbon supporting frame.

5. A color printer as set forth in claim 2, wherein said second transmitting means comprises a shift lever mounted on said carrier pivotally at one end of said shift lever about an axis parallel to said platen and adjacent to said axis about which said ink ribbon supporting frame pivotally moves, said shift lever having a free end engaging with said ribbon guide member and an intermediate portion slidably engaging with a guide groove longitudinally provided at a front edge of said ink ribbon supporting frame, so that said shift lever pivotally moves in accordance with the swinging movement of said ink ribbon supporting frame to slidably shift said ribbon guide member.

6. A color printer, comprising:

a base unit;

a cylindrical platen rotatably mounted on said base unit for supporting and guiding a printing paper;

a printing head;

a carrier reciprocally movable along said platen for supporting said printing head to reciprocally move said printing head along a printing line on the printing paper on said platen;

an ink ribbon supporting frame mounted on said base unit swingably about an axis parallel to said platen, said ink ribbon supporting frame being capable of having detachably mounted thereon a color ink ribbon cassette comprising a cassette case for accommodating therein a color ink ribbon which has a plurality of different color longitudinal stripes so that at least a part of said ink ribbon forms a loop exposed from and extending to the cassette case, which ribbon loop is positioned along said platen and between said printing head and platen, when the color ink ribbon cassette is set on said ink ribbon supporting frame;

*a* ribbon guide [members] *member* slidably mounted on said carrier for supporting said ink ribbon at a position adjacent t said printing head;

means for swing shifting said ink ribbon supporting frame and slide shifting said ribbon guide [members] *member*; and means for indicating the position of said ribbon guide [members] *member* so that a desired one of said color stripes of the ink ribbon is positioned on said printing line, and said indicating means comprising a corrugated configuration formed on one of said ribbon guide [members] *member* and carrier along the sliding direction of the [one of the] ribbon guide [members] *member* and spring means secured to the other of said ribbon guide

[members] *member* and carrier so as to engage with said corrugated configuration.

7. A color printer, comprising:

a base unit;

a cylindrical platen rotatably mounted on said base unit for supporting and guiding a printing paper;

a printing head;

a carrier reciprocally movable along said platen for supporting said printing head to reciprocally move said printing head along a printing line on the printing paper on said platen;

an ink ribbon supporting frame, mounted on said base unit swingably about an axis parallel to said platen, said ink ribbon supporting frame being capable of having detachably mounted thereon a color ink ribbon cassette comprising a cassette case for accommodating therein a color ink ribbon which has a plurality of different color longitudinal stripes so that at lest a part of the ink ribbon forms a loop exposed from and extending to the cassette case, which ribbon loop is positioned along said platen and between said printing head and platen, when the color ink ribbon cassette is set on said ink ribbon supporting frame;

a ribbon guide member slidably mounted on said carrier for supporting said ink ribbon at a position adjacent to said printing head;

shifting means for swing shifting said ink ribbon supporting frame and slide shifting said ribbon guide member so that a desired one of said color stripes of the ink ribbon is positioned on said printing line;

said shifting means comprising a pulse motor, first transmitting means for transmitting a rotational movement of said pulse motor to said ink ribbon supporting frame to swingably move said ribbon frame, and second transmitting means for transmitting the swinging movement of said ink ribbon supporting frame to said ribbon guide member to slidably move said guide member;

said first transmitting means comprising an endless timing belt extending between a timing pulley of said pulse motor and an idle pulley rotatably mounted on the base unit, and belt clamp for connecting said timing belt to said ink ribbon supporting frame; and said second transmitting means comprising a shift lever mounted on said carrier pivotally at one end of the lever about an axis parallel to said platen and adjacent to said axis about which said ink ribbon supporting frame pivotally moves, said shift lever having a free end engaging with said ribbon guide member and an intermediate portion slidably engaging with a guide groove longitudinally provided at a front edge of said ink ribbon supporting frame, so that said shift lever pivotally moves in accordance with the swinging movement of said ink ribbon supporting frame to slidably shift said ribbon guide member.

8. A color printer as set forth in claim 7, further comprising means for indicating the position of said ribbon guide member, said indicating means comprising a corrugated configuration formed on said ribbon guide member and carrier along the sliding direction of said ribbon guide member and spring means secured to said ribbon guide member and carrier to engage with said corrugated configuration.

9. A color printer as set forth in claim 8, wherein said pulse motor is energized slightly past a position at which said spring means resiliently engages with said corrugated configuration, so that a desired one of the color stripes of the color ink ribbon is positioned on the printing line.

10. A color printer, comprising:

a base unit;

a cylindrical platen rotatably mounted on said base unit for supporting and guiding a printing paper;

a printing head;

a carrier reciprocally movable along said platen for supporting said printing head to reciprocally move said printing head along a printing line on the printing paper on said platen;

an ink ribbon supporting frame mounted on said base unit swingably about an axis parallel to said platen, said ink ribbon supporting frame being capable of having detachably mounted thereon a color ink ribbon cassette comprising a first cassette case for accommodating therein a color ink ribbon which has a plurality of different color longitudinal stripes so that at least a part of the ink ribbon forms a loop exposed from and extending to the cassette case, which ribbon loop is positioned along said platen and between said printing head and platen, when the color ink ribbon cassette is set on said ink ribbon supporting frame, said ink ribbon supporting frame being also capable of having detachably mounted thereon another ink ribbon cassette comprising a second cassette case, which has a size different from said first cassette case, for accommodating therein a single color or black ink ribbon having a width smaller than that of said color ink ribbon so that at least a part of said [singlecolor] *single color* ribbon forms a loop in the same manner as said color ink ribbon;

a ribbon guide member slidably mounted on said carrier for supporting said color and single color ink ribbons at a position adjacent to said printing head, said ribbon guide member having two passages for guiding said color and single color ink ribbons, respectively;

means for slide shifting said ribbon guide member so that a desired one of said color stripes of the color ink ribbon is positioned on said printing line; and means for swing shifting said ink ribbon supporting frame so that the position of said first [or second] cassette [cases] *case* substantially [follow] *follows* the shifted position of the color [or single color] ink ribbon[, respectively].

11. A printer as set forth in claim 10, wherein said ink ribbon guide member comprises:

a pair of common guide shafts aligned adjacent to said platen, between which a top end of said printing head is located, a pair of first guide shafts located at respective outer sides of said common guide shafts slightly away from said platen, and a pair of second guide shafts located at respective outer sides of said first guide shafts, said guide shafts all extending in the sliding direction of said guide member, so that when the [singlecolor] *single color* ribbon cassette is set on the ink ribbon supporting frame, the [singlecolor] *single color* ink ribbon extends and runs through one of said first guide shafts, one of said common guide shafts, the other of said common guide shafts, and the other of said first guide shafts, and when the color ribbon cassette is set on the ink ribbon supporting frame, the color ink ribbon extends and runs through one of said second guide shafts, one of said common guide shafts, the other of said common guide shafts, and the other of said second guide shafts.

12. A printer as set forth in claim 11, wherein each of said first guide shafts defines a narrower guide section corresponding to the width of the [singlecolor] *single color* ink ribbon, and each of said second guide shafts defines a wider guide section corresponding to the width of the color ink ribbon.

13. A color printer, comprising:

a base unit;

a cylindrical platen rotatably mounted on said base unit for supporting and guiding a printing paper;

a printing head;

a carrier reciprocally movable along said platen for supporting said printing head to reciprocally move said printing head along *a* printing line on the printing paper on said platen;

an ink ribbon supporting frame mounted on said base unit swingably about an axis parallel to said platen, said ink ribbon supporting frame being capable of having detachably mounted thereon a color ink ribbon cassette comprising a first cassette case for accommodating therein a color ink ribbon which has a plurality of different color longitudinal stripes so that at least a part of the ink ribbon forms a loop exposed from and extending to the first cassette case, which ribbon loop is positioned along said platen and between said printing head and platen, when the color ink ribbon cassette is set on said [ink ribbon] supporting frame, said ink ribbon supporting frame being also capable of having detachably mounted thereon another ink ribbon cassette comprising a second cassette case, which has a size different from said first cassette case, for accommodating therein a single color or black ink ribbon so that at least a part of said single color ribbon forms a loop in the same manner as said color ink ribbon;

means for detecting the size of said ink ribbon cassettes so as to discriminate which ink ribbon cassette is set on said ink ribbon supporting frame;

a ribbon guide member slidably mounted on said carrier for supporting said ink ribbons at a position adjacent to said printing head;

means for slide shifting said ribbon guide member so that a desired one of said color strips of the color ink ribbon is positioned on said printing line; and means for swing shifting said ink ribbon supporting frame so that the position of said first [or second] cassette [cases] *case* substantially [follow] *follows* the shifted position of the color [or single color] ink ribbon[, respectively].

14. A printer as set forth in claim 13, wherein said detecting means comprises a lever pivotally mounted on said ink ribbon supporting frame, which lever is pivotally moved by one of the color or single color ink ribbon cassettes when one of the color or single color ink ribbon cassettes is mounted on said ribbon frame.

15. A printer, comprising:

a base unit;

a cylindrical platen rotatably mounted on said base unit for supporting and guiding a printing paper;

a printing head;

a carrier reciprocally movable along said platen for supporting said printing head to reciprocally move said printing head along a printing line on the printing paper on said platen;

an ink ribbon supporting frame mounted on said base unit swingably about an axis parallel to said platen, said ink ribbon supporting frame being capable of having detachably mounted thereon a color ink ribbon cassette comprising a first cassette case for accommodating therein a color ink ribbon which has a plurality of different color longitudinal stripes so that at least a part of the ink ribbon forms a loop exposed from and extending to the first cassette case, which ribbon loop is positioned along said platen and between said printing head and said platen, when the ribbon cassette is set on said ink ribbon supporting frame, said ink ribbon supporting frame being also capable of having detachably mounted thereon another ink ribbon cassette comprising a second cassette case, which has a size different from said first cassette case, for accommodating therein a single color or black ink ribbon so that at least a part of said single color ribbon forms a loop in the same manner as said color ink ribbon;

means for detecting the size of said ink ribbon cassettes so as to discriminate which ink ribbon cassette is set on said ink ribbon supporting frame;

a ribbon guide member slidably mounted on said carrier for supporting said ink ribbons at a position adjacent to said printing head, said ribbon guide member being operably connected to said ink ribbon supporting frame so that said ribbon guide member *is* slidably [is] moved in cooperation with the swinging movement of said ink ribbon supporting frame;

means for swing shifting said ink ribbon supporting frame and slide shifting said ribbon guide member so that a desired one of said color stripes of the color ink ribbon is positioned on said printing line; and means for locking said ink ribbon supporting frame to prevent the ribbon guide member from being shifted.

16. A printer as set forth in claim 15, further comprising means for returning said ink ribbon supporting frame and said ribbon guide member to their initial positions in which said ribbon guide member is in its uppermost shifted position, when said color ink ribbon cassette is removed from said ink ribbon supporting frame, so that the ribbon frame is locked at the position, when said [single-color] *single color* ink ribbon is set on said ink ribbon supporting frame.

17. A printer as set forth in claim 16, wherein said locking means comprises first and second levers pivotally mounted on said ink ribbon supporting frame, said first lever being pivotally moved by the [singlecolor] *single color* ink ribbon cassette when the single color ink ribbon cassette is mounted on said ink ribbon supporting frame, said second lever being connected to said first lever via spring means for providing a spring force so that said second lever resiliently engages with an engaging portion of said base unit when said first lever is pivotally moved as well as when said ink ribbon supporting frame is in its initial position.

*18. A color printer, comprising:*

*a base unit;*

*a platen mounted on said base unit for supporting a printing paper;*

*a printing head;*

*a carrier reciprocally movable along said platen for supporting said printing head to reciprocally move*

*said printing head along a printing line on the printing paper on said platen;*

*a supporting member mounted on said base unit for detachably and swingably supporting a color ink ribbon cassette, said color ink ribbon cassette comprising a cassette case for accommodating therein a color ink ribbon which has a plurality of different color longitudinal stripes so that at least a part of said ink ribbon forms a loop exposed from and extending to the cassette case, which ribbon loop is positioned along said platen and between said printing head and platen, when the color ink ribbon cassette is set on said supporting member;*

*a ribbon guide member slidably mounted on said carrier for supporting said ink ribbon at a position adjacent to said printing head;*

*slide shifting means for slide shifting said ribbon guide member so that a desired one of said color stripes of the ink ribbon is positioned on said printing line; and*

*swing shifting means for swing shifting said color ink ribbon cassette so that the position of the cassette case substantially follows that of the shifted position of the ink ribbon , said swing shifting means being driven in accordance with said slide shifting means.*

19. A color printer, comprising:

*a base unit;*

*a platen mounted on said base unit for supporting a printing paper;*

*a printing head;*

*a carrier reciprocally movable along said platen for supporting said printing head to reciprocally move said printing head along a printing line on the printing paper on said platen;*

*a supporting member mounted on said base unit for detachably and swingably supporting a color ink ribbon cassette, said color ink ribbon cassette comprising a cassette case for accommodating therein a color ink ribbon which has a plurality of different color longitudinal stripes so that at least a part of the ink ribbon forms a loop exposed from said extending to the cassette case, which ribbon loop is positioned along said platen and between said printing head and platen, when the color ink ribbon cassette is set on said supporting member;*

*a ribbon guide member slidably mounted on said carrier for supporting said ink ribbon at a position adjacent to said printing head; and*

*shifting means for swing shifting said color ink ribbon cassette and slide shifting said ribbon guide member so that a desired one of said color stripes of the ink ribbon is positioned on said printing line, and said shifting means comprising a pulse motor, first means for transmitting a rotational movement of said pulse motor to said color ink ribbon cassette to swingably move said color ink ribbon cassette, and second means for transmitting the swinging movement of said color ink ribbon cassette to said ribbon guide member to slidably move said ribbon guide member.*

*20. A color printer, comprising:*

*a base unit;*

*a platen mounted on said base unit for supporting a printing paper;*

*a printing head;*

*a carrier reciprocally movable along said platen for supporting said printing head to reciprocally move said printing head along a printing line on the printing paper on said platen;*

*a supporting member mounted on said base unit for detachably and swingably supporting a color ink ribbon cassette, said color ink ribbon cassette comprising a cassette case for accommodating therein a color ink ribbon which has a plurality of different color longitudinal stripes so that at least a part of the ink ribbon forms a loop exposed from and extending to the cassette case, which ribbon loop is positioned along said platen and between said printing head and platen, when the color ink ribbon cassette is set on said supporting member;*

*a ribbon guide member slidably mounted on said carrier for supporting said ink ribbon at a position adjacent to said printing head;*

*means for swing shifting said color ink ribbon cassette and slide shifting said ribbon guide member; and*

*means for indicating the position of said ribbon guide member so that a desired one of said color stripes of the ink ribbon is positioned on said printing line, and said indicating means comprising a corrugated configuration formed on one of said ribbon guide member and carrier along the sliding direction of the ribbon guide member and spring means secured to the other of said ribbon guide member and carrier so as to engage with said corrugated configuration.*

*21. A color printer, comprising:*

*a base unit;*

*a platen mounted on said base unit for supporting a printing paper;*

*a printing head;*

*a carrier reciprocally movable along said platen for supporting said printing head to reciprocally move said printing head along a printing line on the printing paper on said platen;*

*a supporting member mounted on said base unit for swingably supporting a ribbon cassette, said supporting member being capable of having detachably mounted thereon a color ink ribbon cassette comprising a first cassette case for accommodating therein a color ink ribbon which has a plurality of different color longitudinal stripes so that at least a part of the ink ribbon forms a loop exposed from and extending to the cassette case, which ribbon loop is positioned along said platen and between said printing head and platen, when the color ink ribbon cassette is set on said supporting member, said supporting member being also capable of having detachably mounted thereon another ink ribbon cassette comprising a second cassette case, which has a size different from said first cassette case, for accommodating therein a single color or black ink ribbon having a width smaller than that of said color ink ribbon so that at least a part of said single color ribbon forms a loop in the same manner as said color ink ribbon;*

*a ribbon guide member slidably mounted on said carrier for supporting said color and single color ink ribbons at a position adjacent to said printing head, said ribbon guide member having two passages for guiding said color and single color ink ribbons, respectively;*

*means for slide shifting said ribbon guide member so that a desired one of said color stripes of the color ink ribbon is positioned on said printing line; and*

*means for swing shifting said color ink ribbon cassette so that the position of said first cassette case substantially follows the shifted position of the color ink ribbon.*

*22. A color printer, comprising:*

*a base unit;*

*a platen mounted on said base unit for supporting a printing paper;*

*a printing head;*

*a carrier reciprocally movable along said platen for supporting said printing head to reciprocally move said printing head along a printing line on the printing paper on said platen;*

*a supporting member mounted on said base unit for swingably supporting a ribbon cassette, said supporting member being capable of having detachably mounted thereon a color ink ribbon cassette comprising a first cassette case for accommodating therein a color ink ribbon which has a plurality of different color longitudinal stripes so that at least a part of the ink ribbon forms a loop exposed from and extending to the first cassette case, which ribbon loop is positioned along said platen and between said printing head and platen, when the color ink ribbon cassette is set on said supporting member, said supporting member being also capable of having detachably mounted thereon another ink ribbon cassette comprising a second cassette case, which has a size different from said first cassette case, for accommodating therein a single color or black ink ribbon so that at least a part of said single color ribbon forms a loop in the same manner as said color ink ribbon;*

*means for detecting the size of said ink ribbon cassettes so as to discriminate which ink ribbon cassette is set on said supporting member;*

*a ribbon guide member slidably mounted on said carried for supporting said ink ribbons at a position adjacent to said printing head;*

*means for slide shifting said ribbon guide member so that a desired one of said color strips of the color ink ribbon is positioned on said printing line; and*

*means for swing shifting said color ink ribbon cassette so that the position of said first cassette case substantially follow the shifted position of the color ink ribbon.*

*23. A color printer, comprising:*

*a base unit;*

*a platen mounted on said base unit for supporting a printing paper;*

*a printing head;*

*a carrier reciprocally movable along said platen for supporting said printing head to reciprocally move said printing head along a printing line on the printing paper on said platen;*

*a supporting member mounted on said base unit for swingably supporting an ink ribbon cassette, said supporting member being capable of having detachably mounted thereon a color ink ribbon cassette comprising a first cassette case for accommodating therein a color ink ribbon which has a plurality of different color longitudinal stripes so that at least a part of the ink ribbon forms a loop exposed from and extending to the first cassette case, which ribbon loop is positioned along said platen and between said printing head and said platen, when the ribbon cassette is set on said supporting member, said supporting member being also capable of having detachably mounted thereon another ink ribbon cassette comprising a second cassette case, which has a size different from said first cassette case, for accommodating therein a single color or black ink ribbon so that at least a part of said single color ribbon forms a loop in the same manner as said color ink ribbon;*

*means for detecting the size of said ink ribbon cassettes so as to discriminate which ink ribbon cassette is set on said supporting member;*

*a ribbon guide member slidably mounted on said carrier for supporting said ink ribbons at a position adjacent to said printing head, said ribbon guide member being operably connected to said color ink ribbon cassette so that said ribbon guide member is slidably moved in cooperation with the swinging movement of said color ink ribbon cassette;*

*means for swing shifting said color ink ribbon cassette and slide shifting said ribbon guide member so that a desired one of said color stripes of the color ink ribbon is positioned on said printing line; and*

*means for locking said ink ribbon cassettes to prevent the ribbon guide member from being shifted.*

*24. A color printer, comprising:*

*a base unit;*

*a platen mounted to said base unit for supporting a printing paper;* a printing head;

a carrier reciprocally moveable along said platen for supporting said printing head and for reciprocally moving said printing head along a printing line on the printing paper;

*a color ink ribbon cassette detachably mounted to said base unit and moveably mounted to said base unit about an axis parallel to said platen said color ink ribbon cassette including a ribbon cassette case and a color ink ribbon accommodated in said cassette case and having a plurality of different color longitudinal strips so that at least a part of said ink ribbon forms a loop exposed from and extending to the cassette case, the ribbon loop being positioned along said platen and between said printing head and platen when the color ink ribbon cassette is mounted to said base unit;*

*a ribbon guide member, moveably mounted on said carrier, for supporting said ink ribbon at a position adjacent to said printing head; means for shifting up and down said ribbon guide member so that a desired one of said color stripes of the ink ribbon is positioned on the printing line; and*

*means for shifting up and down said color ink ribbon cassette so that the position of the cassette substantially follows that of the shifted position of the ink ribbon, said cassette shifting means being driven in synchronism with said ribbon guide member shifting means.*

*25. A color printer comprising:*

*a base unit;*

*a platen, mounted to said base unit, for supporting a printing paper;*

*a printing head;*

*a carrier, reciprocally moveable along said platen, for supporting said printing head and for reciprocally moving said printing head along a printing line on the printing paper;*

*a color ink ribbon cassette detachably mounted to said base unit and moveably mounted to said base unit about an axis parallel to said platen, said color ink ribbon cassette including*

*(i) an ink ribbon cassette case and*

*(ii) a color ink ribbon accommodated in the cassette case and having a plurality of different color longitudinal stripes so that at least a part of said ink ribbon forms a loop exposed from and extending to the cassette case, the ribbon loop being positioned along said platen and between said printing head and platen*

*when the color ink ribbon cassette is mounted to said base unit;*

*a ribbon guide member, moveably mounted on said carrier, for supporting said ink ribbon at a position adjacent to said printing head; and*

*a shifting mechanism for shifting both the ribbon cassette and the ribbon guide member so that a desired on of said color longitudinal stripes of the ink ribbon is positioned on the printing line, wherein the ribbon guide member is moved traversely to the printing line and the ribbon cassette is moved in synchronism with the ribbon guide member so that the position of the cassette substantially follows the shifted position of the ink ribbon.*

* * * * *